(12) United States Patent
Sharkey et al.

(10) Patent No.: US 9,131,125 B2
(45) Date of Patent: Sep. 8, 2015

(54) METHOD AND APPARATUS FOR REDIRECTING A RECEIVING DEVICE IN THE EVENT OF A PROGRAMMING BLACKOUT

(75) Inventors: Jeffrey L. Sharkey, Hermosa Beach, CA (US); Tam T. Leminh, Cypress, CA (US); Alistair E. Jeffs, Los Angeles, CA (US); Robert G. Arsenault, Redondo Beach, CA (US); Huy Q. Tran, Westminster, CA (US); Tommi J. Iten, Redondo Beach, CA (US); David Eric Shanks, Los Angeles, CA (US); Eric J. Bennett, Los Angeles, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 590 days.

(21) Appl. No.: 12/047,406

(22) Filed: Mar. 13, 2008

(65) Prior Publication Data

US 2009/0235315 A1    Sep. 17, 2009

(51) Int. Cl.
*H04N 7/16* (2011.01)
*H04N 7/10* (2006.01)
*H04N 7/20* (2006.01)
*H04N 21/4627* (2011.01)
*H04N 5/44* (2011.01)
*H04N 21/422* (2011.01)
*H04N 21/434* (2011.01)
*H04N 21/438* (2011.01)
*H04N 21/45* (2011.01)
*H04N 21/462* (2011.01)
*H04N 21/4623* (2011.01)
*H04N 21/488* (2011.01)
*H04N 21/61* (2011.01)
*H04N 21/84* (2011.01)
*H04N 21/414* (2011.01)
*H04N 21/418* (2011.01)

(52) U.S. Cl.
CPC ............... *H04N 7/20* (2013.01); *H04N 5/4401* (2013.01); *H04N 21/42202* (2013.01); *H04N 21/4345* (2013.01); *H04N 21/4383* (2013.01); *H04N 21/4524* (2013.01); *H04N 21/4622* (2013.01); *H04N 21/4623* (2013.01); *H04N 21/4627* (2013.01); *H04N 21/4882* (2013.01); *H04N 21/6112* (2013.01); *H04N 21/6143* (2013.01); *H04N 21/84* (2013.01); *H04N 21/4181* (2013.01); *H04N 21/41422* (2013.01)

(58) Field of Classification Search
CPC ............ H04N 21/4524; H04N 21/458; H04N 21/4627
USPC .................................................. 725/40, 27, 32
See application file for complete search history.

(56) References Cited

U.S. PATENT DOCUMENTS

| | | | | |
|---|---|---|---|---|
| 7,370,343 | B1 * | 5/2008 | Ellis | 725/58 |
| 7,530,085 | B2 * | 5/2009 | Tsuria et al. | 725/25 |
| 7,555,012 | B2 * | 6/2009 | Walker | 370/486 |
| 7,856,365 | B2 * | 12/2010 | Fiedotin et al. | 705/2 |
| 7,903,274 | B2 * | 3/2011 | Ohtani | 358/1.15 |

(Continued)

Primary Examiner — James R Sheleheda

(57) ABSTRACT

A receiving device and method for operating the same includes a tuner tuned to a first channel having a first program, a memory storing program guide data therein and a controller in communication with the tuner and the memory. The controller determines the first channel is a blacked out channel, searches the program data in the memory for a second program equivalent to the first program, determines a second channel associated with the second program and tunes the tuner device to the second channel.

19 Claims, 4 Drawing Sheets

(56) References Cited

U.S. PATENT DOCUMENTS

| | | | |
|---|---|---|---|
| 2003/0028889 A1* | 2/2003 | McCoskey et al. | 725/91 |
| 2007/0033624 A1* | 2/2007 | Oh | 725/100 |
| 2007/0226765 A1* | 9/2007 | Bahnck et al. | 725/63 |
| 2007/0250885 A1* | 10/2007 | Ohashi | 725/106 |
| 2008/0066095 A1* | 3/2008 | Reinoso | 725/28 |
| 2008/0066103 A1* | 3/2008 | Ellis et al. | 725/38 |
| 2008/0141317 A1* | 6/2008 | Radloff et al. | 725/87 |
| 2008/0168487 A1* | 7/2008 | Chow et al. | 725/31 |
| 2009/0112930 A1* | 4/2009 | Anguiano | 707/104.1 |
| 2009/0119703 A1* | 5/2009 | Piepenbrink et al. | 725/34 |
| 2009/0119707 A1* | 5/2009 | Zhao | 725/38 |
| 2009/0165049 A1* | 6/2009 | Sekiguchi | 725/39 |
| 2009/0235315 A1* | 9/2009 | Sharkey et al. | 725/68 |
| 2010/0115544 A1* | 5/2010 | Swenson | 725/28 |
| 2014/0365491 A1* | 12/2014 | Macaulay et al. | 707/737 |

* cited by examiner

METHOD AND APPARATUS FOR REDIRECTING A RECEIVING DEVICE IN THE EVENT OF A PROGRAMMING BLACKOUT

TECHNICAL FIELD

The present invention relates generally to a television broadcasting systems, and more specifically, to a method and apparatus to redirect a receiving device to a non-blacked out channel when originally tuned to a blacked out channel.

BACKGROUND

Satellite television has become increasingly popular due to its wide variety of programming. Entertainment in automobiles such as DVD players has also become increasingly popular. It would be desirable to provide a satellite television system for a vehicle so that the wide variety of programming may be enjoyed by the rear passengers.

Set top boxes, sometimes called integrated receiver decoders, are used to receive the satellite signals and decode the signals for playing on a display.

During sporting events, a game may be blacked out in a certain area due to contractual limitations with sports leagues. For example, local stations may not be able to carry a football game if all the tickets are not sold for a particular game.

Subscribers to satellite TV may also have special sports packages through which various events may be received. One example is the NFL Sunday Ticket® provided by DIRECTV®. This package allows users to obtain all the NFL games. Often times, however, a user may desire to watch the broadcast with a particular local broadcasting team. Therefore, the user may first choose a local channel as option for viewing.

When a blackout occurs, a black or blank screen may be provided. In addition, a message that the service is not locally available may also be provided. Viewer satisfaction may be reduced since the viewer is expecting to watch a particular event on the particular channel. Calls to a customer service hotline are typically increased during this period. The increased call volume is costly to the provider and may reduce the satisfaction of the viewer.

SUMMARY

The present disclosure provides a method for redirecting the receiving device to tune to the same program available on a different channel.

In one aspect of the disclosure, a method of operating a receiving device includes storing program data in the receiving device, tuning the receiving device to a first channel having a first program, determining the first channel is a blacked out channel, searching the program data for a second program equivalent to the first program, determining a second channel associated with the second program and tuning the receiving device to the second channel.

In yet another aspect of the disclosure, a receiving device includes a tuner tuned to a first channel having a first program, a memory storing program guide data therein and a controller in communication with the tuner and the memory. The controller determines the first channel is a blacked out channel, searches the program data in the memory for a second program equivalent to the first program, determines a second channel associated with the second program and tunes the tuner device to the second channel.

Other advantages and features of the present invention will become apparent when viewed in light of the detailed description of the preferred embodiment when taken in conjunction with the attached drawings and appended claims.

DETAILED DESCRIPTION

Figure 1:
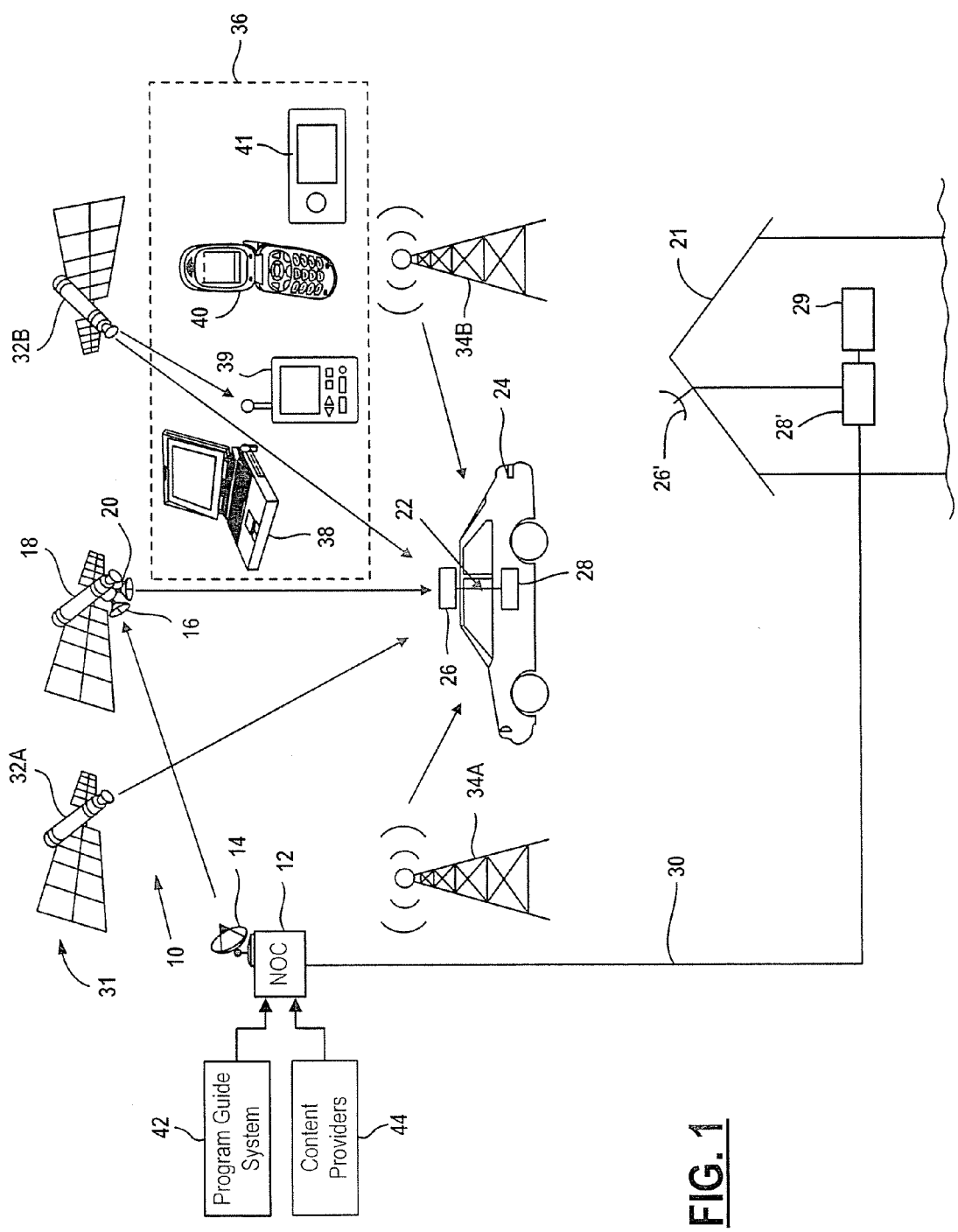
FIG. 1 is a system level view of a satellite broadcasting system according to the present invention.

In the following figures the same reference numerals will be used for the same views. The following figures are described with respect to a satellite television system. However, those skilled in the art will recognize the teachings of the present invention may be applied to various types of television systems including cable.

Referring now to FIG. 1, a satellite television broadcasting system 10 is illustrated. The satellite television broadcasting system 10 includes a network operations center (NOC) 12 that generates wireless signals through a transmitting antenna 14 which are received by a receiving antenna 16 of a satellite 18. The wireless signals, for example, may be digital. A transmitting antenna 20 generates signals directed to various receiving systems including stationary systems such as those in a home 21 (or other building) as well as mobile receiving systems 22. The wireless signals may have various types of information associated with them including location information and program guide information. The wireless signals may also have various video and audio information associated therewith. As illustrated, the mobile receiving system 22 is disposed within an automotive vehicle 24. A receiving antenna 26 receives the wireless signals from the satellite 18 and processes the signals in a mobile receiving device 28. The receiving device 28 will be further described below. A fixed receiving device 28' disposed within a home 21 includes a fixed antenna 26' that communicates signals to a receiving device 28' that provides the signals to a display 29 such as a television. The display 29 may receive on-screen displays from the receiving device 28'. The receiving device 28' may be referred to as a set top box or integrated receiver decoder. In a cable based system the receiving device 28' may be connected to the NOC 12 through a wire 30. In a cable-only based system the satellites and corresponding antennas may be eliminated.

The system 10 may also receive location signals from a GPS system 31 that includes a first satellite 32A and a second satellite 32B. Although only two satellites are shown, a typical GPS system includes several satellites, several of which may be in view at any particular time. Triangulation techniques may be used to determine the elevation, latitude and longitude of the system. A locating system may also include cellular towers 34A and 34B that may be used by the mobile receiving system 22 to determine a location. Cellular phones typically include a GPS locating system. As the vehicle 24 moves about, the exact coordinates in latitude and longitude may be used to determine the proper designated marketing area for local television and broadcasting. The geographic position may determine if a blackout is appropriate as described below.

The present invention may also be used for displaying various wireless information on a personal mobile device 36 such as a laptop computer 38, a personal digital assistant 39, a cellular telephone 40 and a personal media player 41. It should be noted that these devices and the automotive-based devices may also receive wireless signals having various types of information associated therewith from the cellular towers 34A and 34B.

Content providers 44 may represent a plurality of content providers that provide content to the network operation 12 for ultimate communication to the user-receiving devices 28, 28'. The content providers 44 may provide content through tapes, live feeds, or optical fiber or cable. The content providers 44 may provide different sources for the same content.

A program guide system 42 may provide content guide information to the network operation center 12. The program guide system 42 organizes data available regarding the programming channels and organizes them for ultimate transmission to the receiving devices 28, 28'. The receiving devices may receive the program guide data and display a grid guide in response thereto. The program guide data may be referred to as a program object. The program object may also include identifiers for the type of program (movie, sports, series), a series or short identifier and an episode number for a series. As will be further described below, a content identifier, a Tribune Media Services® ID, a program information packet or another identifier may be used as an identifier for a particular program. These may be found in the data corresponding to the program guide system 42. The same or equivalent program or event may have the same or similar packet identifier, program-associated data, Tribune Media Services® ID or content identifier.

Figure 2:
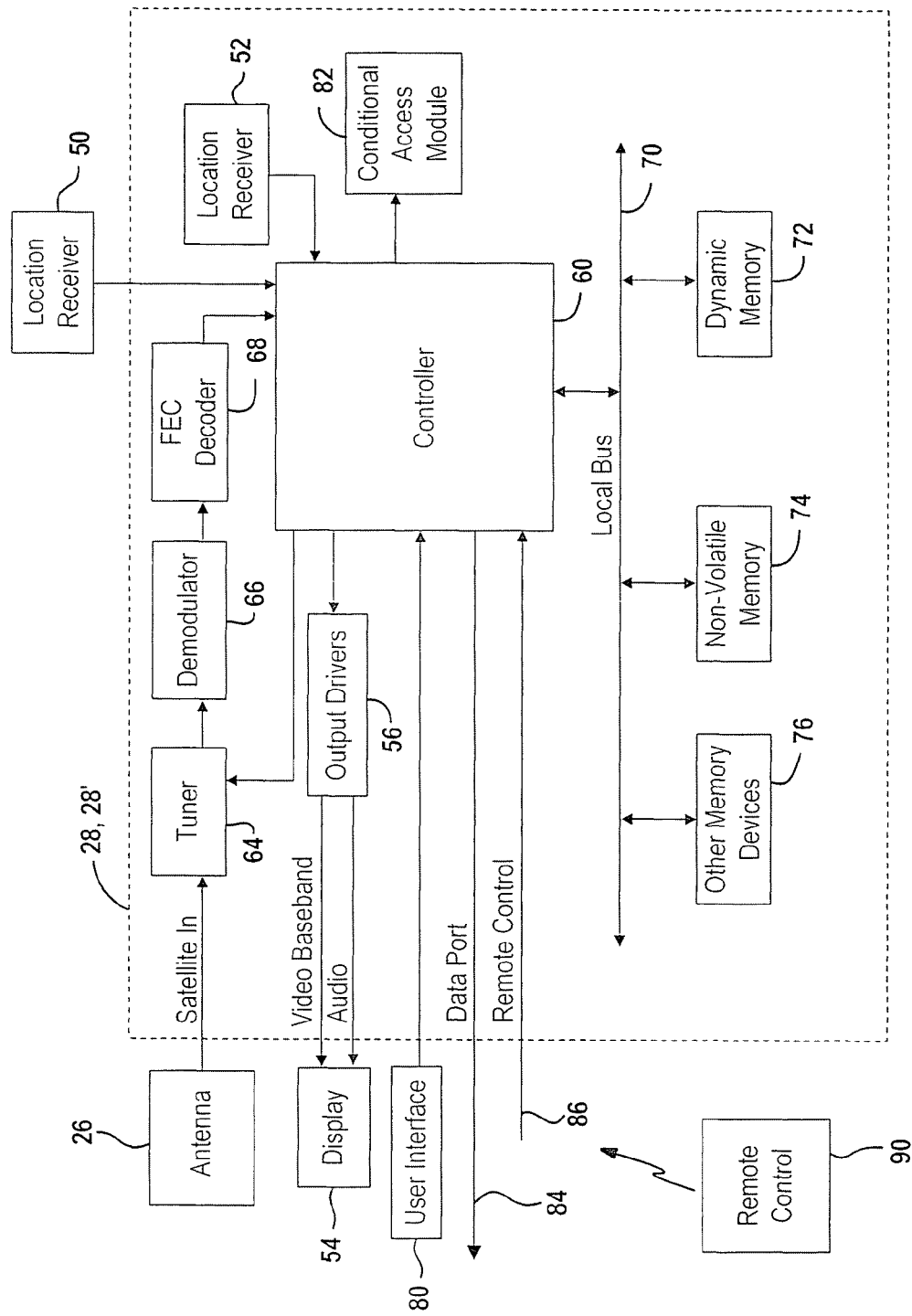
FIG. 2 is a block diagrammatic view of a vehicle having a receiving system according to the present invention.

Referring now to FIG. 2, a receiving device 28, 28' is illustrated in further detail. Antenna 26 may be various types of antennas including a rotating antenna which is used to track the relative movement of the satellite or other transponding device with respect to the vehicle. The antenna 26 may be a single fixed antenna used for satellite television reception, or a number of antennas such as one for receiving television signals and one coupled to a GPS location receiver 50. The antenna 26 may also be an electronic antenna.

The receiving device 28 may also include a location receiver 52 integrated therein. The location receiver 52 may be a GPS receiver. In a preferred embodiment, only one location receiver 50, 52 may be provided in the system. However, the location receiver 50, 52 may be part of the vehicle 24 or may be part of the mobile receiving system 22, 36. The controller 60 may be coupled directly to location receiver 52 and/or location receiver 50. The receiving device 28 may include or be associated with a display 54. The display 54 may be incorporated into the device 36 or within the vehicle 24. The display 54 may include output drivers 56 used for generating the desired audio and video outputs suitable for the particular display 54.

A controller 60 may be a general processor such as a microprocessor. The controller 60 may be used to coordinate and control the various functions of the receiving device 28. These functions may include a tuner 64, a demodulator 66, a forward error correction decoder 68 and any buffers and other functions. The tuner 64 receives the signal or data from the individual channel. The demodulator 66 demodulates the signal or data to form a demodulated signal or data. The decoder 68 decodes the demodulated signal to form decoded data or a decoded signal. The controller 60 may be similar to that found in current DirecTV set top boxes which employ a chip-based multifunctional controller. The controller 60 may be used to control tuner 64 to tune to another channel as described below.

The controller 60 may include or be coupled to a local bus 70. The local bus 70 may be used to couple a dynamic memory 72 such as RAM which changes often and whose contents may be lost upon the interruption of power or boot up. The bus 70 may also be coupled to a non-volatile memory 74. The non-volatile memory may be an in-circuit programmable type memory or a hard disk drive. One example of a non-volatile memory is an EEPROM. One specific type of EEPROM is flash memory. Flash memory is suitable since it is sectored into blocks of data segments that may be individually erased and rewritten.

Other memory devices 76 may also be coupled to local bus 70. The other memory devices may include other types of dynamic memory, non-volatile memory, or may include such devices such as a digital video recorder. The display 54 may be changed under the control of controller 60 in response to the data in the dynamic memory 72 or non-volatile memory 74. Program guide data may be stored in one of the memory devices 72, 74 and 76.

The controller 60 may also be coupled to a user interface 80. User interface 80 may be various types of user interfaces such as a keyboard, push buttons, a touch screen, a voice activated interface, or the like. User interface 80 may be used to select a channel, select various information, change the volume, change the display appearance, or other functions. The user interface 80 is illustrated as part of the receiving device. However, should the unit be incorporated into a vehicle, the user interface 80 may be located external to the receiving device such as dial buttons, voice activated system, or the like incorporated into the vehicle and interface with the mobile receiving device.

A conditional access module card 82 (CAM) may also be incorporated into the receiving device. Access cards such as a conditional access module (CAM) cards are typically found in DirecTV units. The access card 82 may provide conditional access to various channels and wireless signals generated by the system. Not having an access card or not having an up-to-date access card or module 82 may prevent the user from receiving or displaying various wireless content from the system.

A data port 84 may be coupled to the controller 60 for transmitting or receiving information from a device. A remote control input 86 may be used as one type of interface device. The remote control 86 provides various data to the controller 60 from a remote control 90.

Although a mobile unit is illustrated, the above description is equally applicable to fixed or stationary systems. The location receivers 50, 52 may be eliminated in a fixed system.

Figure 3:
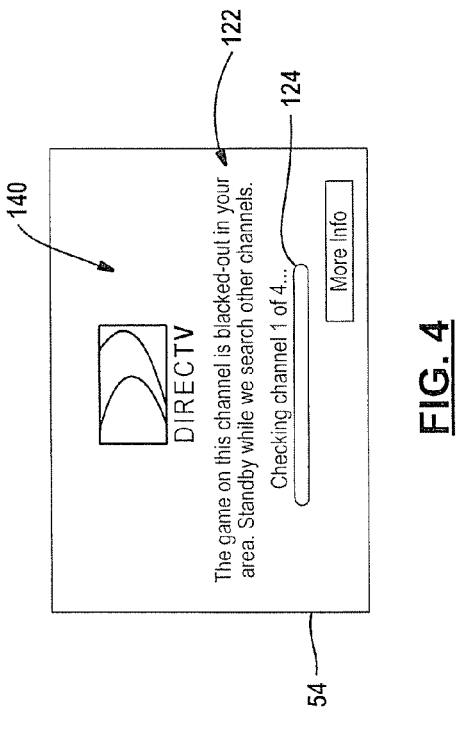
FIG. 3 is a view of a first embodiment of an on-screen display describing a blackout and search process.

Referring now to FIG. 3, an on-screen display 110 generated from the receiving device 28 on the display 54 associated with the receiving device 28 is illustrated. In this example, a station identifier 112, a program description 114, a date 116 and time 118 may all be provided. A program time 120 may also be provided. A "search" message, such as "The game on this channel is blacked-out in your area. Stand by while we search other channels" is provided in message area 122. A status bar 124 may generate a moving image to communicate to the user that a search is taking place. The data associated with the on-screen display 110 may be stored in one of the memory devices 72-76 of FIG. 2.

Figure 4:
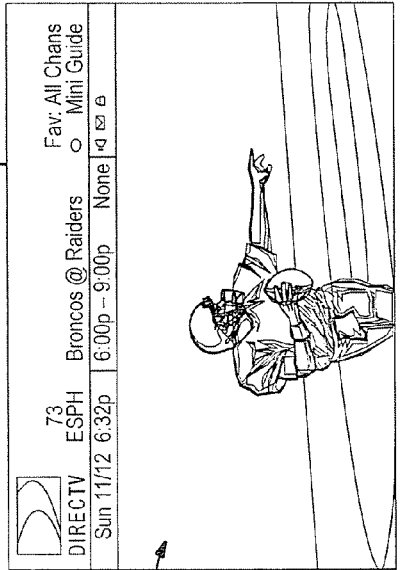
FIG. 4 is a view of a second embodiment of an on-screen display describing a blackout and search process.

Referring now to FIG. 4, an alternative on-screen display 140 to that illustrated above in FIG. 3 is set forth. In this example, the channel and program information may not be displayed. However, message area 122 and the status bar 124 may be displayed.

Figure 5:
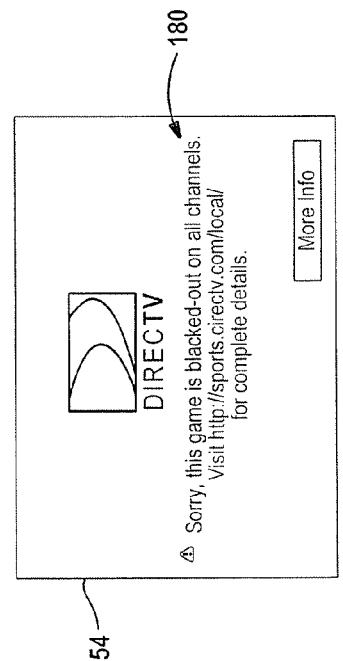
FIG. 5 is a view of an on-screen display illustrating a successful redirection.

Referring now to FIG. 5, should an equivalent program be found, the receiving device 28 may be tuned to an alternative channel with the same or equivalent program. In this example, a program guide portion 160 for the redirected channel and the program name 162 may be displayed on the display 54. The guide display 160 may disappear after a predetermined amount of time or after making a button selection on a user interface.

Figure 6:
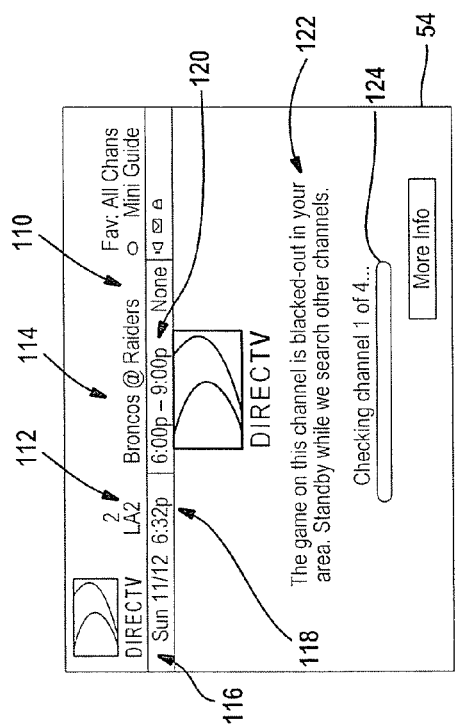
FIG. 6 is a view of an on-screen display illustrating an unsuccessful redirection.

Referring now to FIG. 6, a "SORRY" or unsuccessful search message may be displayed in the event that an equivalent program may be found. The "SORRY" on-screen display 180 may have a message such as "Sorry, this game (or program) is blacked-out on all channels." A website or other information may be provided in the "SORRY" on-screen display 180.

It should be noted that an equivalent program may be the identical program but may not be the exact same broadcast. For example, a program may be the same or equivalent program but not broadcast in high definition. That is, an equivalent program may still be considered equivalent even if one is a high definition broadcast whereas the other is a standard definition broadcast. Another equivalent type program is Dolby Digital® versus non-Dolby Digital®, closed captioned version versus non-closed captioned versions, and letterbox versus non-letterbox. Each of the above may still have the same identifier.

Figure 7:
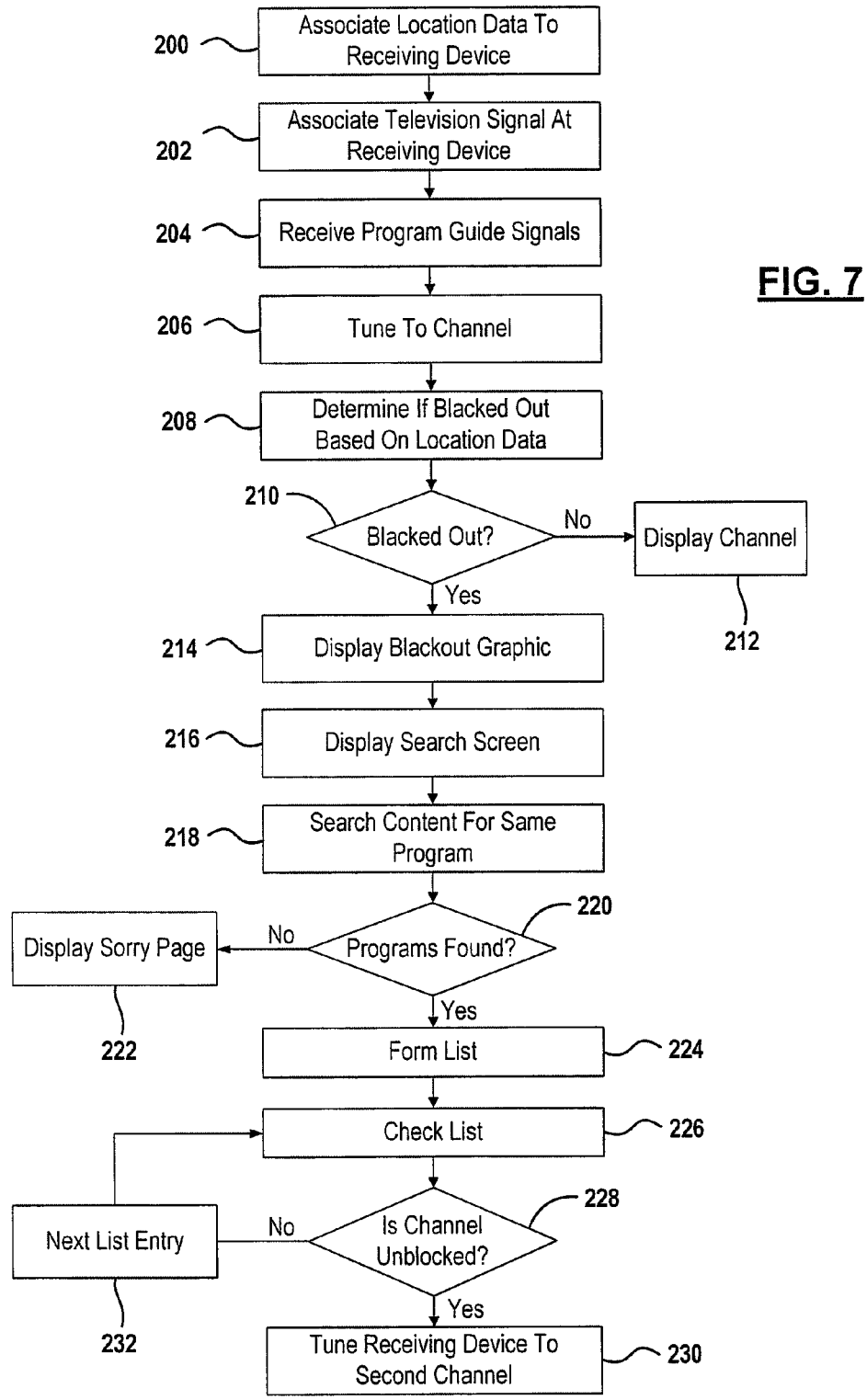
FIG. 7 is a flow chart of a redirection process for redirecting receiving device to tune to another channel.

Referring now to FIG. 7, a flowchart of a method for redirecting a channel to an equivalent program is set forth. In step 200, location data may be associated with the receiving device. If the device is a mobile device, the location data may be provided through GPS. If the device is a fixed device, the location data may be programmed or stored in the receiving device based upon zip code or the like. In step 202, the television signal is received at the receiving device for a particular channel to which the receiving device is tuned. For a satellite system, the signals may be received from a satellite. For a terrestrial system, the signals may be received over the air or through a cable or fiber optic.

In step 204, program guide signals may also be received at the receiving device. The receiving device may receive program guide signals in various ways including through a cable or through a satellite. A terrestrial wireless network may also be used to provide program guide signals to the receiving device. The program guide data may be received in a different way than the program signals. For example, guide data may be terrestrially delivered whereas the program signals may be delivered via satellite. The receiving device stores the program guide data from the program guide signals in the memory of the receiving device.

In step 206, the receiving device is tuned to the channel. In step 208, it is determined if the channel is blacked out based on location data. The channel may be blacked out from the provider or may be blacked out at the receiving device. A control word packet (CWP) may determine whether the channel received with the program or channel signal should be blacked out for a particular location. In step 208, it is determined if the channel is blacked out. The location data stored within the receiving device may be checked. That is, the location of the receiving device may be compared to the location or designated marketing area associated with the blackout. If the channel is not blacked out in step 210, step 212 displays the channel.

If the channel is blacked out in step 210, step 214 displays a blackout graphic. The blackout graphic may be retrieved from the memory within the user device. Examples of blackout displays are set forth in FIGS. 3 and 4. In step 216, a search screen and search graphic 122 may be also generated in conjunction with the blackout graphic. The search screen 216 may inform the user that a search for an equivalent program on another channel is being performed. In step 218, content for the same or equivalent program is performed. The various program guide data is used for the search. The receiving device searches the program guide data for the same or an equivalent program identifier in each program-associated data for each program. As mentioned above, various types of program identifiers such as the TMS identifier or content identifier may be associated with a particular content or event.

In step 220, if a program is not found on another channel, a "SORRY" or unsuccessful search page may be displayed in step 222. One example of a "SORRY" display is illustrated in FIG. 6.

In step 220, if an equivalent program or programs are found on another channel, a list of channels or programs may be generated in step 224. The list may be set-up from a best choice to a least desirable choice. For example, a high definition choice may be higher than a standard definition choice. Other criteria may also be used in ordering the list. The channel/program list may be limited to a number of entries such as, but not limited to, five. In step 226, the list is checked starting with the most desirable list entry. If the list entry is unblocked, in step 228, step 230 tunes the receiver to the second channel having the same or equivalent content. Preferably, the process takes only minimal time. By displaying the on-screen displays for a predetermined amount of time, such as 5-20 seconds, the user is aware that a change of channel has automatically been performed.

In step 228, if the channel on the list is blocked, step 232 allows the next list item or channel to be checked. Steps 226 and 228 are then repeated. Of course, forming the list may be optional and directly tuning to the second channel if not blacked out may be performed.

While particular embodiments of the invention have been shown and described, numerous variations and alternate embodiments will occur to those skilled in the art. Accordingly, it is intended that the invention be limited only in terms of the appended claims.

What is claimed is:

1. A method of operating a receiving device comprising:
storing program data in the receiving device;
storing receiving device location data corresponding to the receiving device location in the receiving device;
tuning the receiving device to a first channel having a first program;
determining the first channel is a blacked out channel at the receiving device in response to comparing the receiving device location data to the program data;
searching the program data for programs equivalent to the first program;
determining a list of entries corresponding to program equivalents of the first program;
ordering the list to form a re-ordered list of program equivalents;
determining a second channel from the re-ordered list of program equivalents;
determining whether the second channel is blacked out;
when the second channel is not blacked out, tuning the receiving device to the second channel; and during the steps of searching and determining and prior to tuning, generating a searching on-screen display indicating the receiving device is searching for another channel.

2. A method as recited in claim 1 wherein prior storing program data, receiving program data from a satellite.

3. A method as recited in claim 1 wherein prior storing program data, receiving program data from a terrestrial system.

4. A method as recited in claim 1 wherein storing program data in the receiving device comprises storing a content identifier for each program.

5. A method as recited in claim 1 wherein searching the program data comprises determining a first content identifier for the first program and finding a second content identifier equal to the first content identifier.

6. A method as recited in claim 1 wherein generating an on-screen display comprises display guide data.

7. A method as recited in claim 1 wherein tuning the receiving device to the second channel comprises tuning the receiving device to a second channel when the second channel is available and further comprising displaying an unsuccessful search message when the second channel is not available.

8. A method as recited in claim 1 wherein tuning the receiving device to the second channel comprises tuning a tuner of the receiving device to a second channel.

9. A method as recited in claim 1 wherein storing program data in a receiving device comprises storing program data in a memory.

10. A receiving device comprising:
a display;
a tuner tuned to a first channel having a first program;
a memory storing program guide data and receiving device location data therein; and
a controller in communication with the tuner and the memory and determining the first channel is a blacked out channel in response to comparing the receiving device location data to the program data, searching the program data in the memory for programs equivalent to the first program, determining a list of entries corresponding to program equivalents of the first program, re-ordering the list to form a re-ordered list of program equivalents, determining a second channel from the re-ordered list of program equivalents, determining whether the second channel is blacked out and tuning the tuner to the second channel when the second channel is not blacked out, said controller, prior to tuning, generating an on-screen display during searching the program data and determining the second channel indicating the controller is searching for the second channel.

11. A receiving device as recited in claim 10 wherein the tuner comprises a satellite tuner.

12. A receiving device as recited in claim 10 wherein the tuner comprises a cable television tuner.

13. A receiving device as recited in claim 10 wherein the memory stores a content identifier for each program including a first content identifier and a second content identifier.

14. A receiving device as recited in claim 13 wherein the controller searching program data comprises finding a second content identifier equal to the first content identifier.

15. A receiving device as recited in claim 10 wherein the on-screen display comprises display guide data.

16. A receiving device as recited in claim 10 wherein the controller displays an unsuccessful search message on a display when the second channel is not available.

17. A receiving device as recited in claim 10 wherein the memory comprises a flash memory.

18. A receiving device as recited in claim 10 wherein the memory comprises a RAM.

19. A system comprising:
a satellite;
a network operations center communicating the program guide data and programming to the satellite;
a receiving device as recited in claim 10; and
said satellite communicating the program guide data and programming to the receiving device.

* * * * *